United States Patent
Connolly et al.

(10) Patent No.: US 10,877,750 B1
(45) Date of Patent: Dec. 29, 2020

(54) CONTAINERIZED STORAGE MICROSERVICE WITH DIRECT CONNECTION TO REQUESTING APPLICATION CONTAINER

(71) Applicant: DataCore Software Corporation, Fort Lauderdale, FL (US)

(72) Inventors: Nicholas C. Connolly, Purley (GB); Robert Bassett, Pensacola, FL (US); Roni J. Putra, Pompano, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 0 days.

(21) Appl. No.: 16/717,897

(22) Filed: Dec. 17, 2019

(51) Int. Cl.
*G06F 9/22* (2006.01)
*H04L 9/32* (2006.01)
*G06F 13/20* (2006.01)
*G06F 21/44* (2013.01)

(52) U.S. Cl.
CPC .............. *G06F 9/226* (2013.01); *G06F 13/20* (2013.01); *G06F 21/44* (2013.01); *H04L 9/3236* (2013.01); *G06F 2213/40* (2013.01)

(58) Field of Classification Search
CPC .......... G06F 9/226; G06F 13/20; G06F 21/44; H04L 9/3236
See application file for complete search history.

(56) References Cited

U.S. PATENT DOCUMENTS

| | | | |
|---|---|---|---|
| 6,356,915 B1 * | 3/2002 | Chtchetkine | G06F 16/192 707/823 |
| 10,360,009 B2 * | 7/2019 | Holman | G06F 8/61 |
| 10,545,738 B1 * | 1/2020 | Jaeger | G06F 8/36 |
| 10,678,447 B2 * | 6/2020 | Hallisey | G06F 9/45558 |
| 2018/0046446 A1 * | 2/2018 | Turovsky | G06F 8/71 |
| 2018/0088935 A1 * | 3/2018 | Church | G06F 11/3051 |
| 2018/0136931 A1 * | 5/2018 | Hendrich | G06F 11/302 |

(Continued)

OTHER PUBLICATIONS

E. R. Giles, "Container-based virtualization for byte-addressable NVM data storage," 2016 IEEE International Conference on Big Data (Big Data), Washington, DC, 2016, pp. 2754-2763. (Year: 2016).*

(Continued)

*Primary Examiner* — Glenn A. Auve
(74) *Attorney, Agent, or Firm* — Michael Best & Friedrich LLP

(57) ABSTRACT

A containerized storage microservice is described. The containerized storage microservice, and its corresponding architecture, provide an environment wherein an application container accesses containerized storage services through a direct connection. This allows the operating system file system to be effectively bypassed in the provision of storage services. In one example, a library provides a basic file system and is arranged underneath the application container. The library essentially intercepts storage requests and emulates a thin file system. Instead of invoking the kernel of the operating system to process each storage request, the library allows the storage request to bypass the kernel and pass the storage request to the storage microservice. The containerized storage microservices are available in different types, and are configured so that they can be stacked to provide customized sets of storage services to different types of application containers.

15 Claims, 20 Drawing Sheets

(56) References Cited

U.S. PATENT DOCUMENTS

2018/0373505 A1* 12/2018 Engquist ............... G06F 8/40
2019/0303345 A1* 10/2019 Zhu ................ G06F 12/1072

OTHER PUBLICATIONS

K. Bakshi, "Microservices-based software architecture and approaches," 2017 IEEE Aerospace Conference, Big Sky, MT, 2017, pp. 1-8. (Year: 2017).*

A. Warke, M. Mohamed, R. Engel, H. Ludwig, W. Sawdon and L. Liu, "Storage Service Orchestration with Container Elasticity," 2018 IEEE 4th International Conference on Collaboration and Internet Computing (CIC), Philadelphia, PA, 2018, pp. 283-292. (Year: 2018).*

J. Watada, A. Roy, R. Kadikar, H. Pham and B. Xu, "Emerging Trends, Techniques and Open Issues of Containerization: A Review," in IEEE Access, vol. 7, pp. 152443-152472;Oct. 31, 2019. (Year: 2019).*

S. Sultan, I. Ahmad and T. Dimitriou, "Container Security: Issues, Challenges, and the Road Ahead," in IEEE Access, vol. 7, pp. 52976-52996; May 1, 2019. (Year: 2019).*

* cited by examiner

CONTAINERIZED STORAGE MICROSERVICE WITH DIRECT CONNECTION TO REQUESTING APPLICATION CONTAINER

This application relates generally to data representation and more particularly to a containerized storage microservice for such data representation.

BACKGROUND OF THE INVENTION

Application containers have been used to allow the deployment of corresponding functionalities without unduly consuming or wasting processing resources. Specifically, rather than requiring a full-fledged operating system for each application, the containers in an environment implement only the basic elements of the operating system in support of their runtime requirements, and also do so by sharing the resources of the underlying operating system.

The independent operation of an application container may be referred to as a microservice, since the container can provide its service independently and since it typically does so using minimal operating system resources. Respective microservices in an environment (e.g., cluster) can operate with other microservices using application programming interfaces. This arrangement allows the introduction of new services as interchangeable components in a fashion that is both flexible and efficient with respect to consuming additional operating system resources.

While application containers provide significant flexibility and efficiency, there remains a need for improved storage services. One problem with providing storage services is that they are managed through an operating system, creating a bottleneck where multiple applications compete for the completion of storage services requests. Another problem is the execution of ownership and permission criteria among multiple users and/or applications using storage services, which creates both a bottleneck and undue complexity in the execution of storage requests. Still another problem is the presence of potential security issues involving communications between requesting applications and the operating system, and the operating system and corresponding storage requests.

A containerized microservice that improves the depth, quality and security of storage services while retaining the flexibility and extensibility of the container environment is needed.

SUMMARY OF THE INVENTION

A containerized storage microservice is described. In one example, the containerized storage microservice is configured to provide the functionality of volume presentation along with all related interactions including the receipt and processing of IO requests and related services. In lieu of (or in addition to) volume presentation, the containerized storage microservice may receive simple data requests without requiring the specifics of volume presentation or the corresponding request protocols thereto.

The containerized storage microservice architecture provides an environment wherein an application container accesses containerized storage services through a direct connection. Preferably, the operating system file system is effectively bypassed in the provision of storage services. Instead, in the container environment, a library that provides file system services is arranged underneath the application container. The library essentially intercepts storage requests and emulates a thin file system. Instead of invoking the kernel of the operating system to deal with each storage request, the library allows the storage request to bypass the kernel and pass the storage request to the storage microservice.

The containerized storage microservices are preferably available in different types, and are configured so that they can be stacked to provide customized sets of storage services to different types of application containers.

The containerized storage microservices also provide enhanced data access security.

In one example, the containerized storage microservice implements a stream architecture to organize and manage underlying storage requests. It may also interact with a store to provide underlying data storage.

The store, which may also be referred to as a data store, is where underlying data is stored in a persistent manner. In one example, the store is an object store. In other examples, the store may be composed of other forms of virtually-presented storage devices that are, in turn, supported by physical storage devices.

The present invention can be embodied in and in connection with various forms, including but not limited to business processes, computer implemented methods, computer program products, computer systems and networks, user interfaces, and application programming interfaces.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1A:
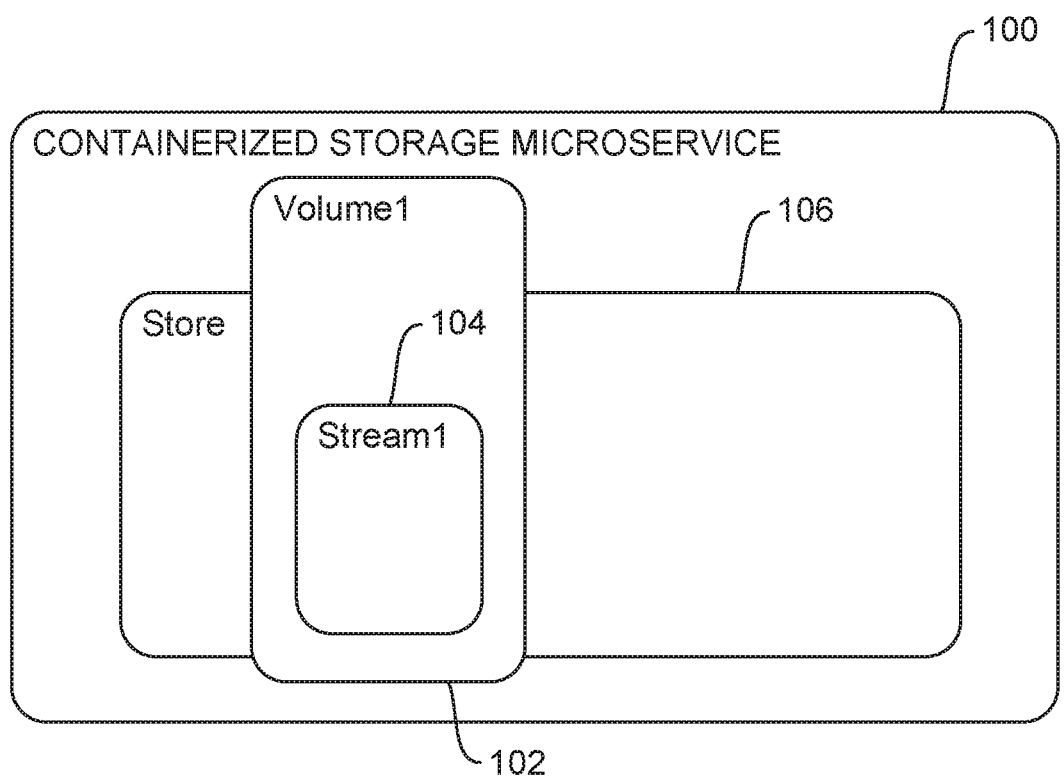
FIGS. 1A-C are block diagrams illustrating a containerized storage microservice with various corresponding architectures.

FIG. 1A is a block diagram illustrating an example of a containerized storage microservice 100, which includes a corresponding stream 104 architecture. The containerized storage microservice 100 provides the functionality of volume 102 presentation along with all related interactions including the receipt and processing of IO requests and related service. Preferably, the containerized storage architecture also implements a stream 104 in the management of storage operations, and interacts with a store 106 to provide underlying data storage.

The store 106, which may also be referred to as a data store, is where underlying data is stored in a persistent manner. In one example, the store 106 is an object store. In other examples, the store 106 may be composed of other forms of virtually-presented storage devices that are, in turn, supported by physical storage devices. The store 106 may also simply be physical storage devices.

The stream 104 (optional) is a readable and extendible history of all of the writes. Preferably, a time stamp is correlated to entries in the stream 104 (e.g., t0-tx) to assist in organizing the stream, and to provide an index into the stream. In object implementations, the stream 104 preferably includes object information including a key or other identification of the object(s) corresponding to the entries in the stream. A stream may be referred to as "active" or "open" when it can still be written to.

An image is a representation of data in a volume 102 that is made by reference to the stream. An image can be thought of as a "view" or an "index" into a stream, to facilitate certain types of accesses. The image may be generated by referencing metadata within the stream. The image may be stored for future use, or may be generated on demand, by referencing the stream including the metadata therein. Various different kinds of images may be provided, including a full image, a sparse image and a meta image. An image may be thought of as a time-based representation of a volume in the stream.

A volume 102 is the unit of presentation to client devices. Applications see and interact with volumes as their storage resources. In a containerized environment, an application container references a containerized storage microservice for storage resources. Consistent with the stream architecture, volumes may be composed of streams, images, and/or other volumes.

Figure 1B:
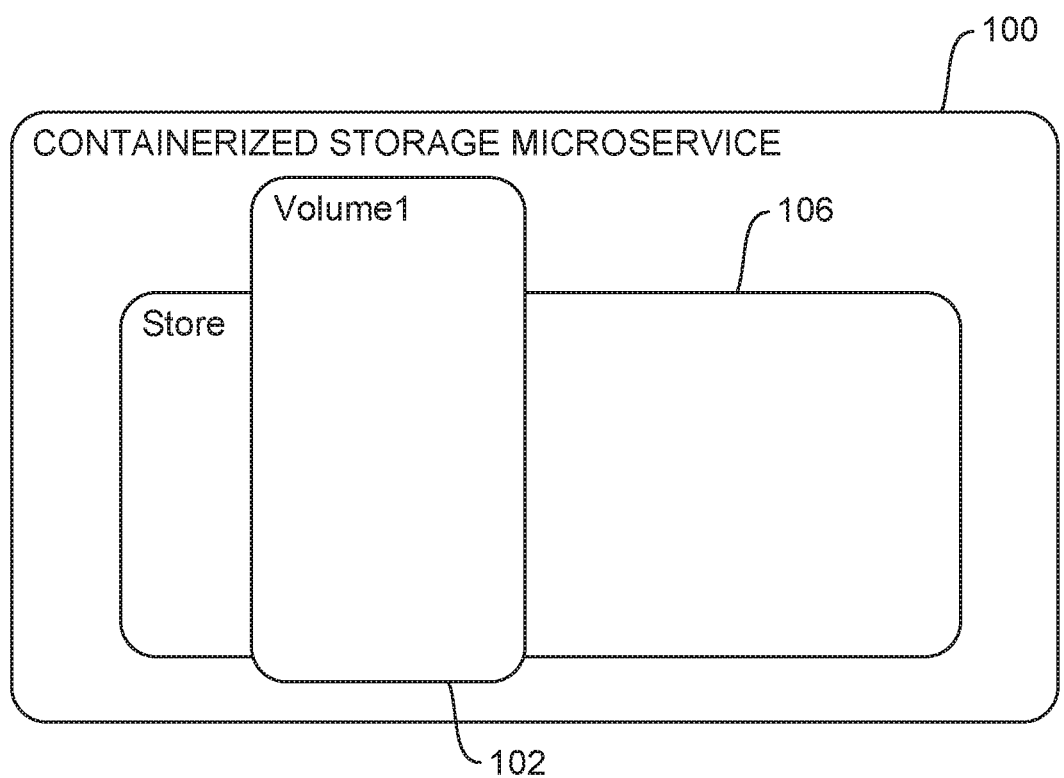
Figure 1C:
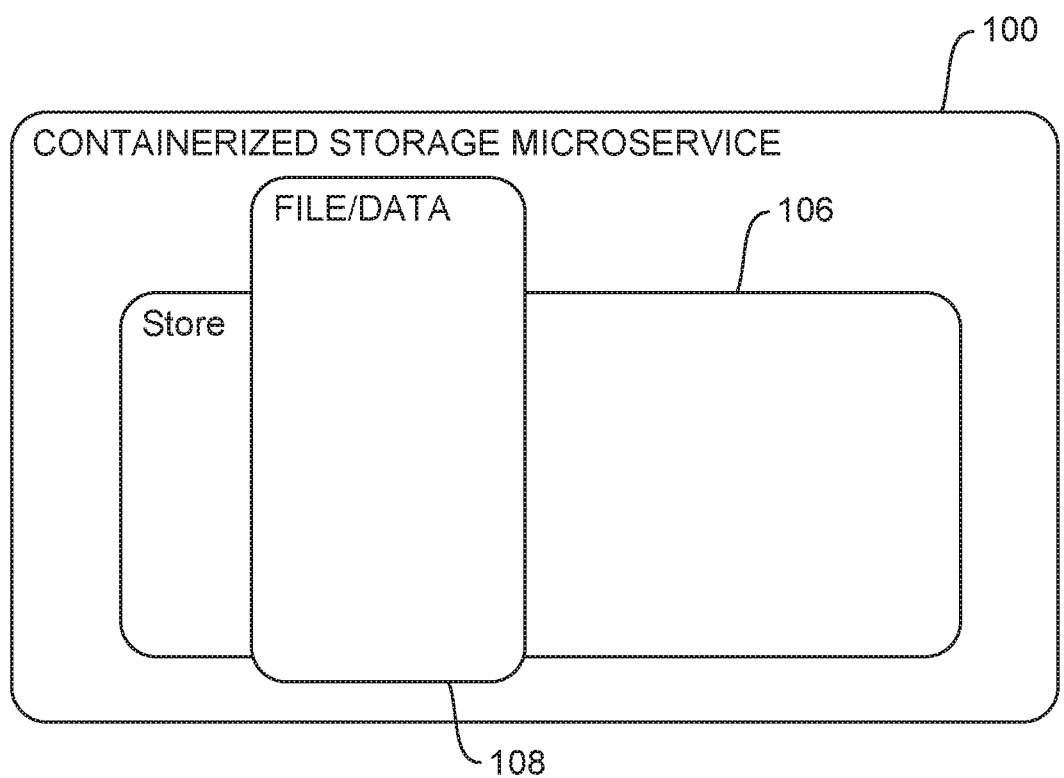

The containerized storage microservice is not limited to stream-based implementations or an object-based store 106. FIG. 1B illustrates an example where stream implementation is omitted. Here, the volume can be represented without maintaining a stream, such as by managing a traditional mapping of the blocks in the volume. Furthermore, the storage microservice may be configured so as not to require volume-based presentation of storage resources, as shown in FIG. 1C. There, an application may simply interact with the containerized storage microservice as a generic provider of data or files 108, without the constraints of volume-based storage.

Figure 2:
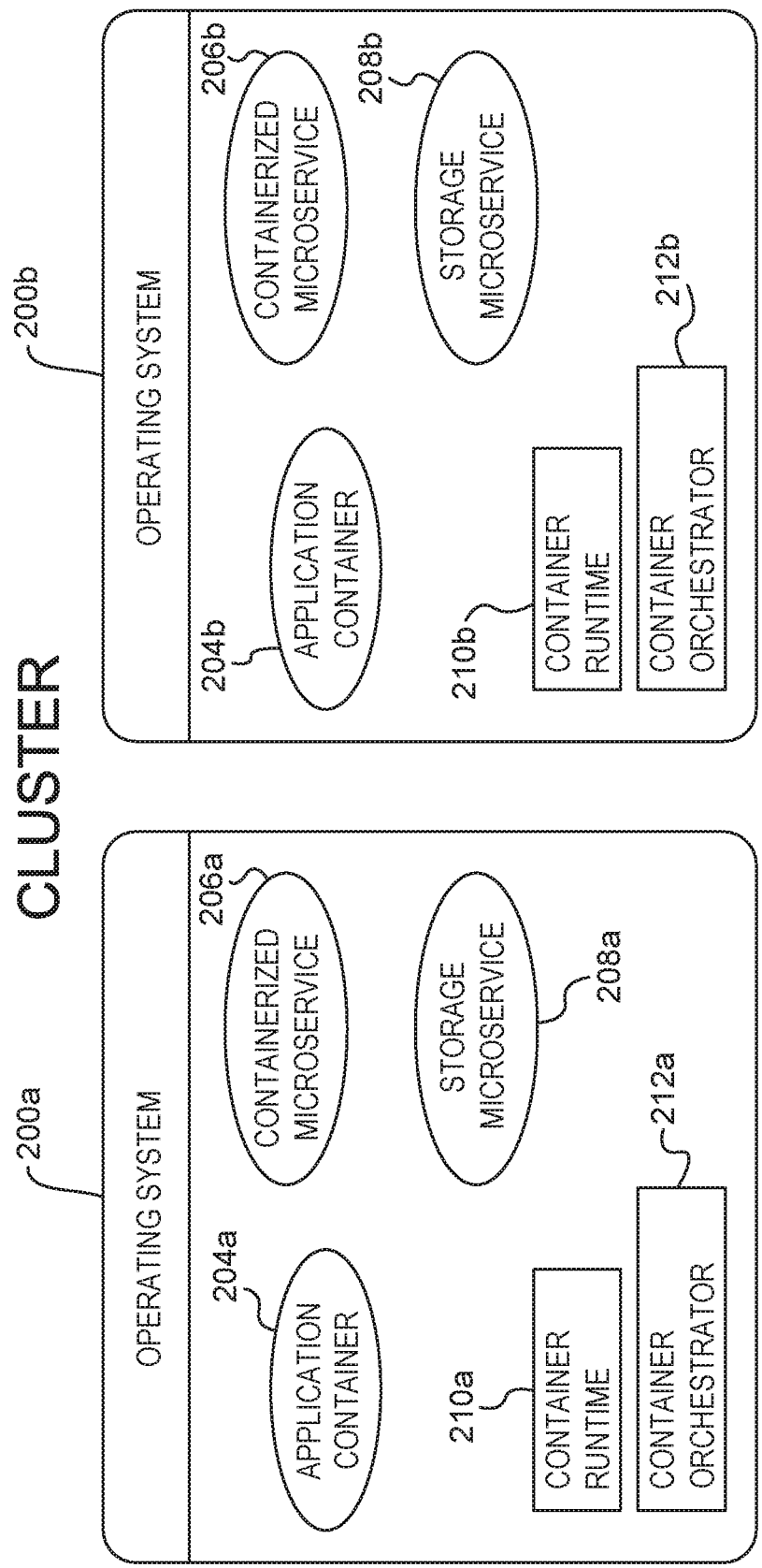
FIG. 2 is a block diagram illustrating a cluster of computing environments implementing the containerized storage microservice.

FIG. 2 illustrates a cluster of computing environments 200a-b implementing the containerized storage microservice 208a-b. The respective environments include container orchestrators 212a-b that deploy and manage the corresponding container based applications, such as the application containers 204a-b, containerized microservice 206a-b and storage microservice 208a-b.

Each of the environments also includes a corresponding host operating system. Any type of operating system environment may be implemented to carry out the containerized storage microservice described herein, including but not limited to Microsoft, Apple, and Linux based operating systems. That is, the containerized storage microservice can run on any of physical, virtual or cloud infrastructures. Regardless of the type of operating system, the containers 204a-b, 206a-b, 208a-b preferably obtain basic services from the corresponding operating system kernel in a shared fashion. The container runtime 210a-b initializes the containers 204a-b, 206a-b, 208a-b and communicates with the kernel to start the respective containerized processes.

FIGS. 1A-C also illustrate the relationship of a volume 102 and an associated stream 104 and data store 106. The volume 102, implemented by the stream 104, appears like a normal block device to an application container.

The store 106 may be thought of as the substrate of data storage where objects implemented in the architecture reside and persist. In one example, as introduced above, the store 106 is an object store. However, also as noted above, the store 106 is not necessarily object-based. The store 106 may be constituted of physical media or may also be virtualized media (which, in turn, may have corresponding underlying physical storage, provided otherwise). The store 106 is intended to conceptually illustrate such a substrate, but it should be understood that it is not necessarily a single monolithic storage entity. Rather, the underling data store 106 may comprise an underlying hierarchical organization of storage, physical and/or virtual. It is also noted that where physical storage resources are implemented, they may be variously embodied, including but not limited to hard disks, optical discs, tape, solid state memory, etc.

The stream 104 has the constituent components as described herein. It can be implemented in various forms of simple or complex data structure, including but not limited to tree structures, queue and stack structures, maps, etc.

With the containerized storage microservice (FIGS. 1A-C, 100; FIG. 2, 208a-b), the application containers 204a-b can be configured to see the volume 102 as a disk for the purposes of storage transactions, and interface with the volume 102 with respect to IO transactions without requiring the application containers 204a-b to have any need to know of or interact with the underlying specifics of the stream 104 or the store 106.

A volume 102 has the characteristics of a "normal" block device. It behaves like a disk in that it is block level oriented and is readable and writable. That is, when a client device writes "a" to block 0 and later reads block 0, the client device receives "a". When a client later writes "f" to block 0 and then reads block 0, the client receives "f" in response to the read, not the previously stored "a". However, the stream 104 includes additional functionality and characteristics beyond those of a normal block device such as a disk.

It is further noted that in FIG. 1A, as in other figures of the same type in this description, the stream 104 is not encapsulated within the volume 102. The intent is to illustrate that the volume 102, which is accessible as a normal volume 102 by the application container, has an associated stream 104, with the stream 104 having the underlying data store 106 as a storage resource foundation.

Figure 3:
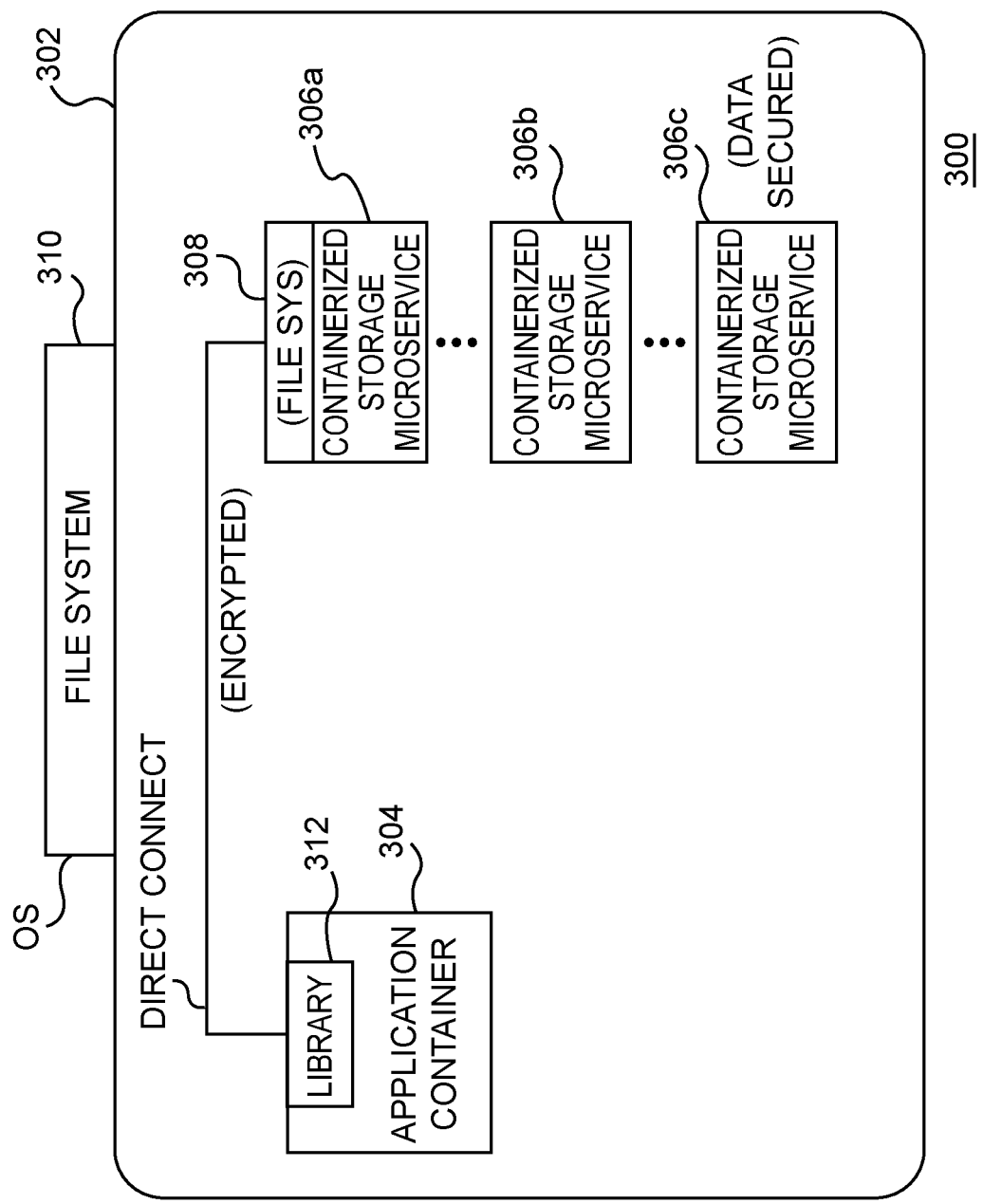
FIG. 3 is a block diagram illustrating an environment wherein application containers access storage services through a direct connection to a containerized storage microservice.

FIG. 3 is a block diagram illustrating an environment 300 wherein an application container 304 accesses storage services through a direct connection to a containerized storage microservice 306a-c. There may be multiple application containers 304, but only one need be shown for ease of discussion. Here, the operating system file system 310 is effectively bypassed in the provision of storage services 306a-c. Instead, in the container environment, a library 312 is inserted into the application. The library 312 presents a basic file system interface to the application. The library communicates with a file system module 308 in the storage stack, passing the file system requests across. The library 312 essentially intercepts storage requests and, along with the module 308, emulates a thin file system. Instead of invoking the kernel of the operating system to process each storage request, this arrangement allows the storage request to bypass the kernel and pass the storage request to the file system module 308 in the storage microservices 306a-c stack. This provides portability and removes the operating system file handling from the processing path. Additionally, as will be explained further below, it allows a more secure path between the application container 304 and the containerized storage microservices 306a-c.

In a preferred implementation, a different volume is created for each application container 304. This avoids ownership and permission issues that arise from shared use of the volume. With the one-to-one relationship between application container and containerized storage microservices that is facilitated by this disclosure, all ownership and permission issues for the volume can be applied uniquely to the application container 304 to which it is designated. The containerized storage microservices can thus also omit the operating system from ongoing execution of ownership and permission issues.

With respect to cryptographic security, the operating system traditionally relies upon access control to mask the data. However, with the configuration of directly connecting the application container 304 to the containerized storage microservices 306a-c, there are multiple security enhancements. First, access control is initially dictated by the one-to-one correspondence of application container 304 to corresponding, assigned volume. Additionally, the application container 304 is configured with an attribute that determines that only an un-modified version of the application may access the data in the volume. This can be carried out in the form of a check-sum to verify that the application making the request for data has not been modified. Still further, the containerized storage microservices 306a-c stack is built from layers (i.e., 306a, 306b, 306c, etc.), with each layer having a cryptographic hash. This helps to ensure that only authorized data services are present within each layer.

In one embodiment, technologies such as Intel SGX (Secure Enclave) are used to protect the data at each layer in the storage stack. A secure enclave is a feature supported by the CPU that cryptographically limits access to the data to a specific piece of code—even the operating system is unable to access it. This approach ensures that nothing can see the data as it passes through the storage stack.

With the direct connection of the application container 304 to the containerized storage microservices 306a-c, the cryptographic security features bypass the operating system and the operating system itself cannot decrypt the data. This removes a potential point of weakness in securing the data from unauthorized access.

Figure 4:
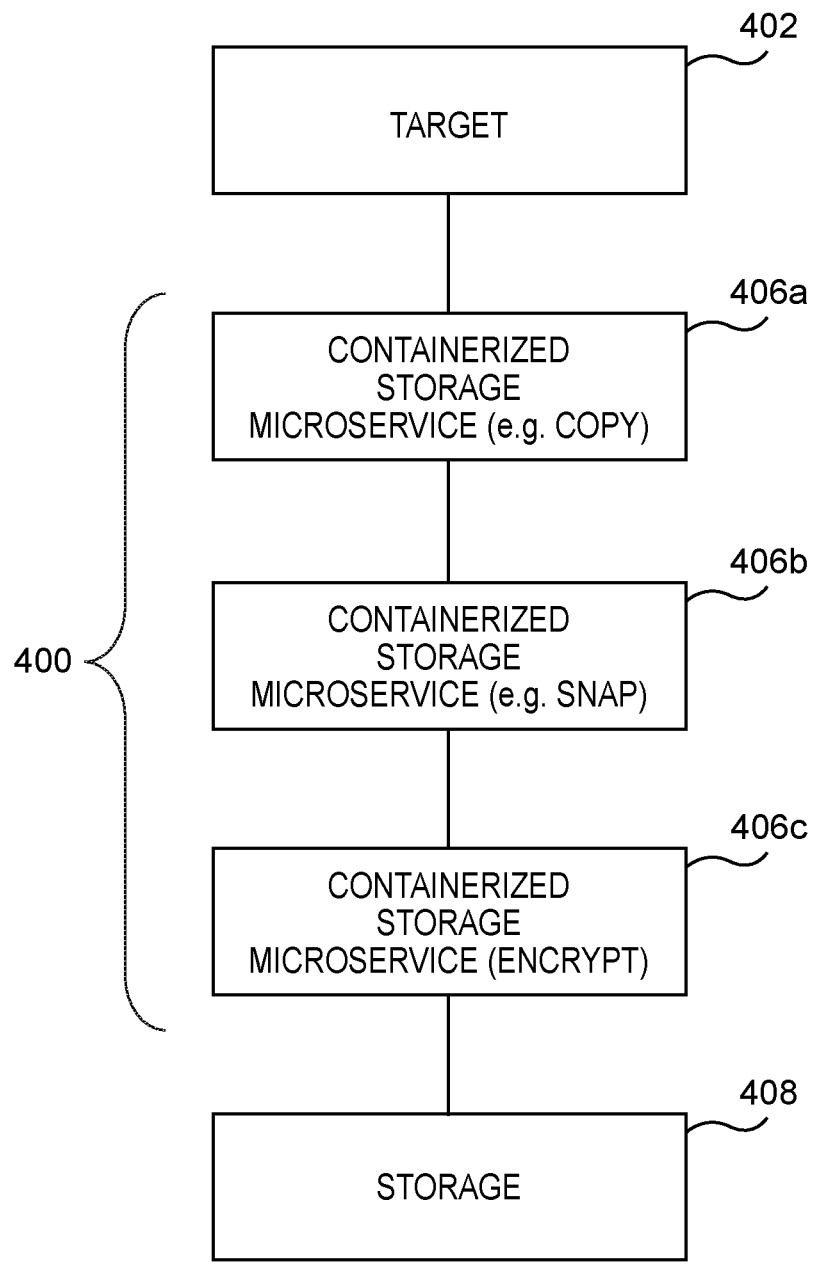
FIG. 4 is a schematic diagram illustrating a containerized storage microservice stack.

FIG. 4 is a schematic diagram illustrating a containerized storage microservice stack 400 in more detail. Conceptually, the stack 400 resides between the storage request target 402 and the underlying storage resources 408. According to this aspect of the disclosure, the storage services are broken down into any number of storage services "building blocks". In this fashion, in lieu of an unwieldy one-size-fits-all approach to storage services, they are broken down into sub-services that can be custom built to fill the needs of the particular application container(s) accessing the stack 400. As indicated in FIG. 4, for example, one containerized storage microservice 406a specifically provides a copy operation, another containerized storage microservice 406b specifically provides a snap operation, and another containerized storage microservice 406c may be configured to provide an encryption operation. These containerized storage microservice blocks may be built in various configurations. For example, a given application container may invoke a microservices stack that includes many encryption blocks, or there may be several different containers with encryption capability.

Figure 5:
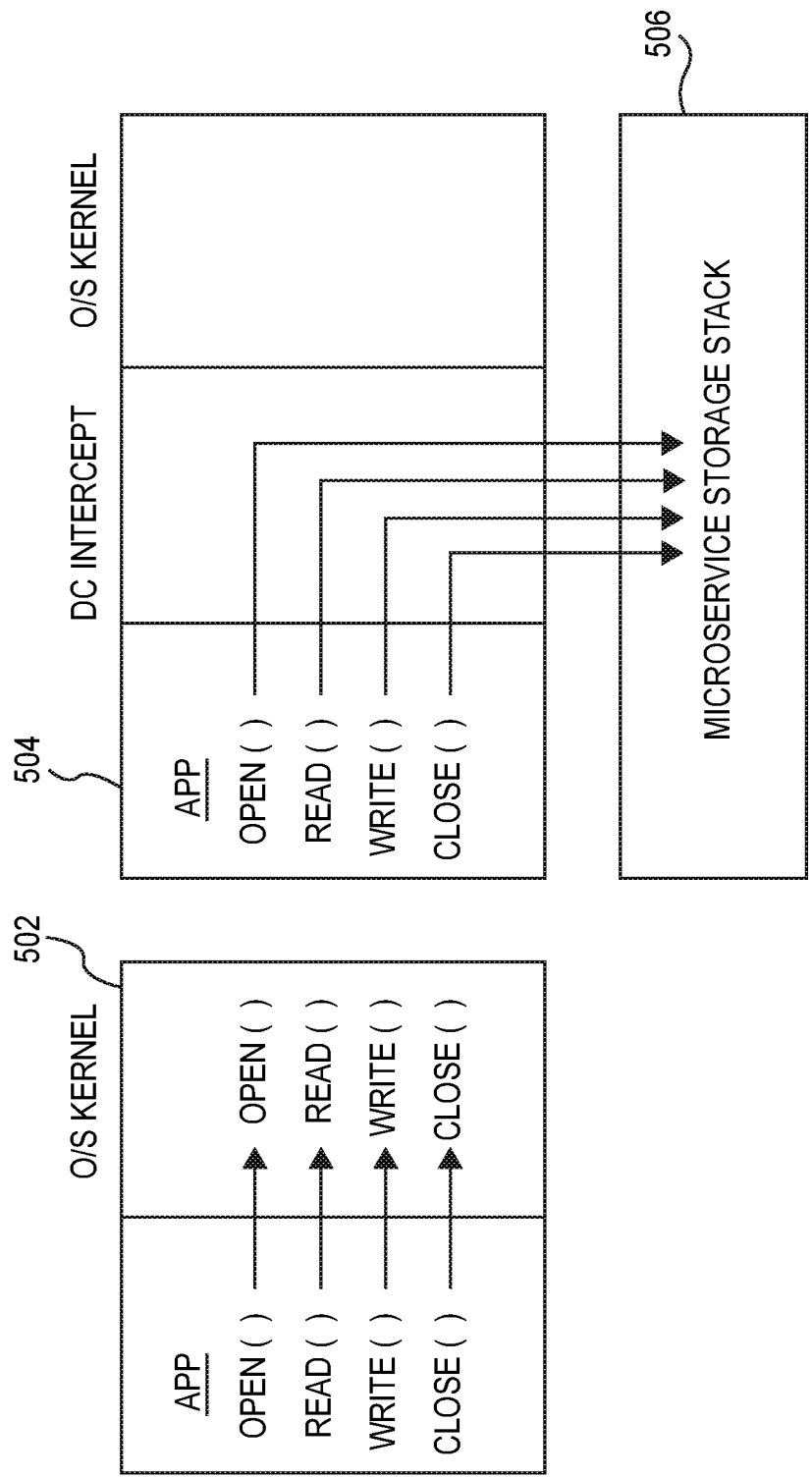
FIG. 5 is a schematic diagram illustrating interception of storage services requests for direct connection to the storage microservice stack.

FIG. 5 is a schematic diagram further illustrating interception of storage services requests for direct connection to the storage microservice stack. In a conventional arrangement 402, an application directs storage requests (e.g., open( ), read( ), write( ), close( ), etc.) to the operating system kernel, thus essentially interrupting processing and invoking the full suite of file system services provided by the kernel. In the direct connect configuration 504, every storage request (e.g., open( ), read( ), write( ), close( ), etc.) is intercepted and directly funneled to the microservice storage stack 506. There are two examples of ways in which direct connect can be applied; as an intercept for file system calls and also as an interceptor for I/O to a raw block device (in which case there is no need for the file system layer in the storage stack). The former may be referred to as a file intercept and the latter may be referred to as a block intercept.

Figure 6A:
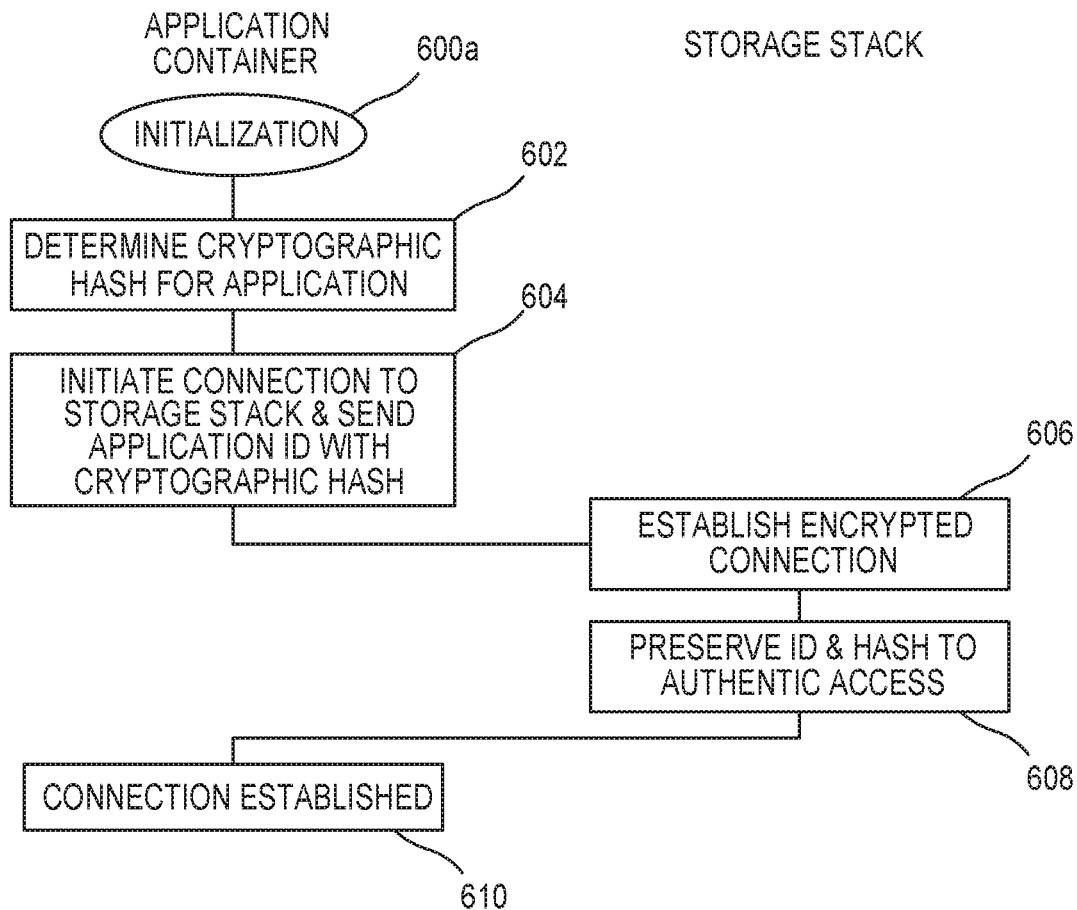
FIGS. 6A-C are flow diagrams illustrating fully encrypted storage services request processing, including initialization, open, and read 600c processes.
Figure 6B:
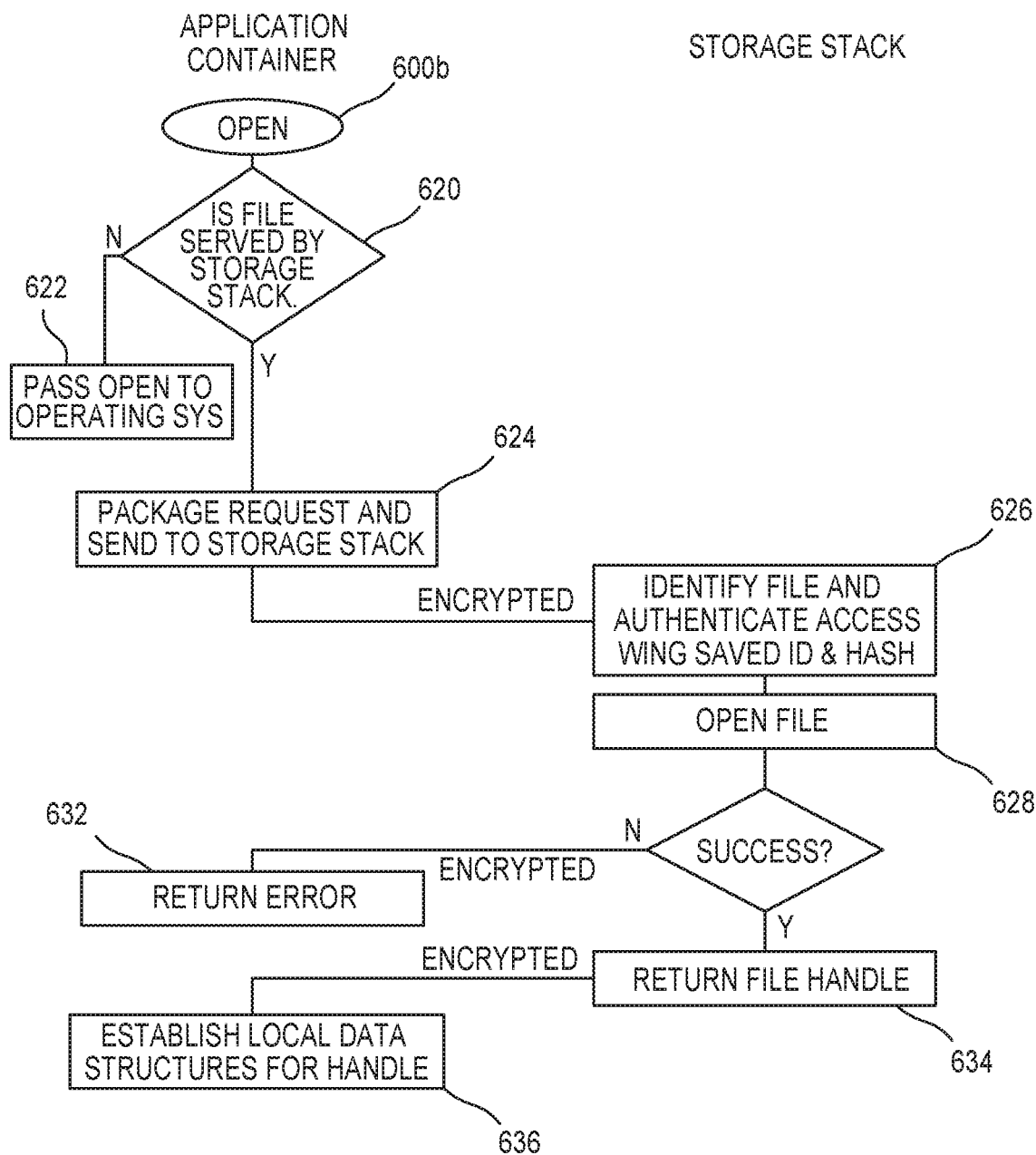
Figure 6C:
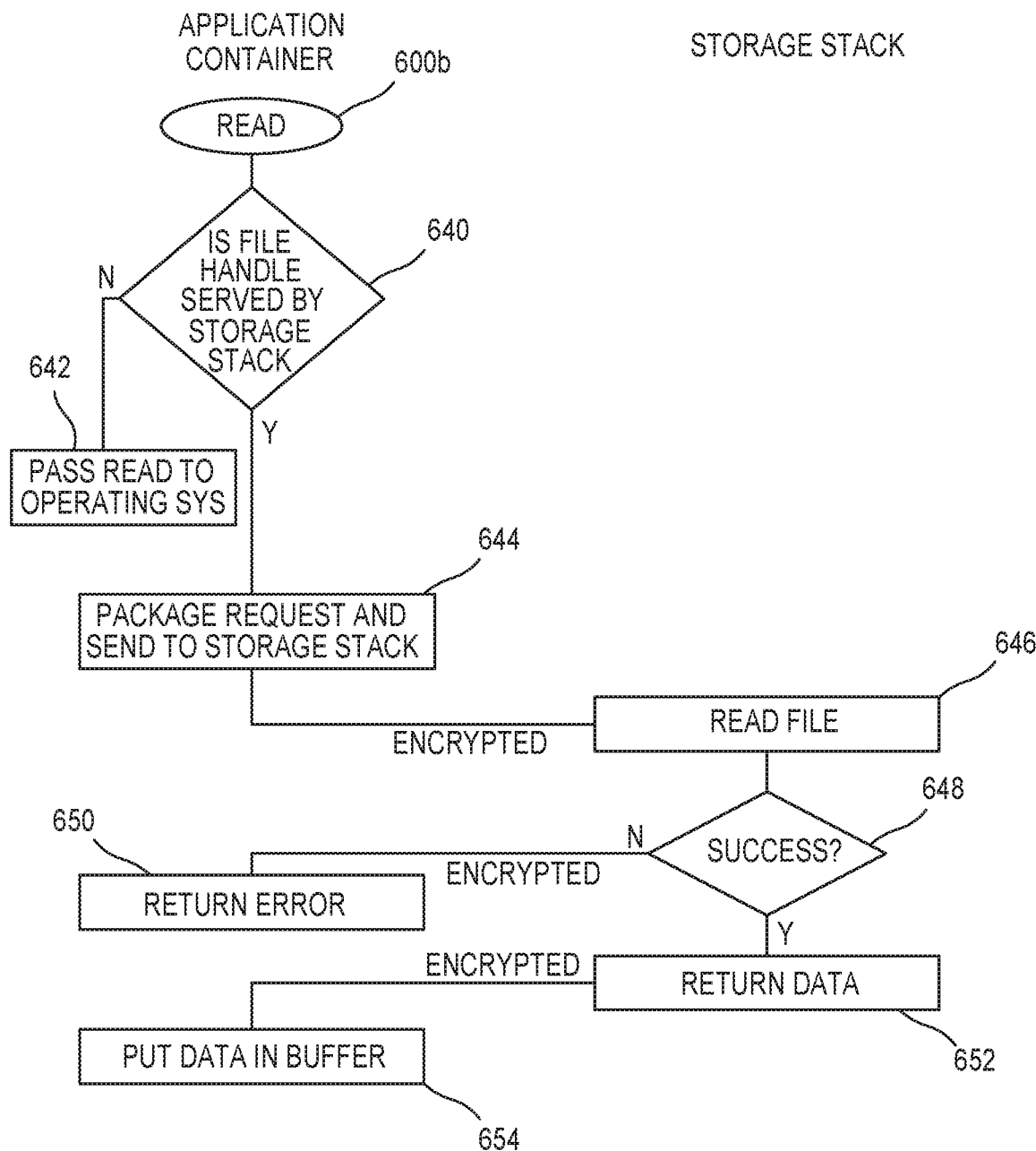

FIG. 6A-C are flow diagrams illustrating fully encrypted storage services request processing, including initialization 600a, open 600b and read 600c processes.

The initialization process 600a commences with a determination 602 of the cryptographic hash for the application. The cryptographic hash can, for example, be determined using a software library provided by the underlying platform, or using specialised hardware support such as the Intel Software Guard Extensions Remote Attestation. Once the cryptographic hash has been determined, the application container initiates connection 604 to the storage stack, for ultimately sending its application ID with the cryptographic hash to the storage stack. The storage stack initially establishes 505 an encrypted connection with the application container, then receives the application ID and cryptographic hash through the encrypted connection. The application ID and cryptographic hash are preserved 608 to authenticate access. A secure and verifiable connection 610 is thus established with the application container.

The open process 600b initially determines 620 whether the file to be opened is served by the storage stack. If not, an open is passed 622 to the operating system. If so, the application container packages 623 a request and sends it to the storage stack, preferably through an encrypted connection. The storage stack identifies 626 the file and authenticates access using the saved application ID and cryptographic hash, and then the file can be opened 628. Determination 630 whether the file can be successfully authenticated and opened then dictates further processing. If access cannot be authenticated to open the file, then the storage stack returns 632 an error to the application container. Otherwise, the storage stack returns 634 a file handle, and the application container can then establish 636 local data structures for the handle.

The read process 600c initially entails determining 640 whether the file handle is served by the storage stack. If not, the read is passed 642 to the operating system. If so, then the application container packages 644 a request and sends it to the storage stack, again through an encrypted connection. The storage stack carries out a read process 646, with an error returned 650 if it is not successful (648). If the read is successful, the data is returned 652 through an encrypted connection and the application container stores 654 the data in a buffer.

Figure 7:
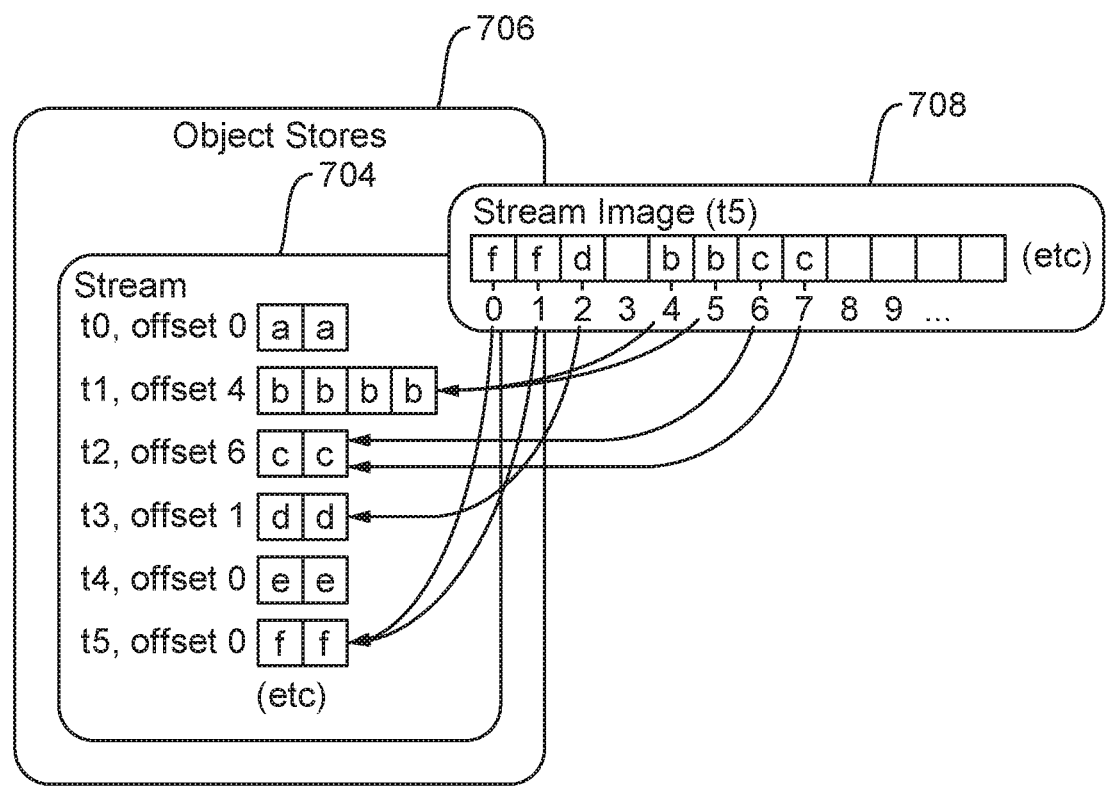
FIG. 7 is a block diagram illustrating a stream implemented on top of an object-based architecture.

As introduced above, in one example, the containerized storage microservice implements a stream and object-based architecture (e.g., FIG. 1A). FIG. 7 is a block diagram illustrating that a stream 704 implemented using an object-based architecture. An associated stream image 708 illustrates that the stream 704 records changes and implements random read access for a version of a volume accessible by an application container.

The stream 704 maintains a recording of all changes to the volume. In one embodiment, if a block has never been written, then it defaults to all 0's (shown as empty blocks in the stream image 708). It should be understood that other default statuses, including but not limited to all 1's may be provided for blocks that have not been written.

The stream 704 is relatively simplified for ease of depiction, but generally it includes a sequence of the write transactions directed to the volume, with the write transactions in turn having differing numbers of blocks. For example, at t0 two blocks "a" are written to the volume and thus are also reflected in the stream 704 starting at offset 0. Similarly, at times t1-t5, a sequence of write transactions with differing numbers of blocks are reflected in the stream 704.

A stream image 708 references the stream 704 to represent the state of the volume at any point in time. In FIG. 7, the stream image 708 is a full image and shows the "current" state of the volume at time t5. However, a stream image can be constructed (and saved) from the stream metadata for any point of time that is represented in the stream 704. For a full image stream as of time t5, the state of the volume is obtained by progressing through the stream metadata (which points to the data in the stream), in reverse time order. For example, at time t1 the stream 704 records four blocks depicted as "b" starting at offset 4; at time t2 the stream 704 records two blocks depicted as "c" starting at offset 6, and so on. Progressing in reverse time order from timestamp t5 for a full image results in the stream image (t5) 708 as shown. In this fashion, the stream image is constructed from the stream metadata, rather than having to be constructed from the data.

In this fashion, the stream 704 maintains a recording of changes to the volume, including data that is ultimately overwritten, but any given image may be built or maintained with references that collectively represent the entire state of the volume at time tx.

Thus, the image 708 and the corresponding stream 704 can be used to recover, replicate or provide any variety of storage management functions for the corresponding volume at any given time t up through the time "now". The stream image 708 may be saved at any time, or may be generated by accessing the stream 704 after the fact (e.g., at time t5, without having retained the image for past time t3, one can retroactively generate an image for time t3).

Each change in the stream may have associated metadata. Typically, each write transaction will have a piece of metadata that is provided in the stream. Such a write transaction may of course include numerous blocks, meaning that a separate piece of metadata does not need to be maintained for every single block. This reduces overall overhead.

As such, the architecture provides for a retainable representation of the full version of the volume at any given time, even after the fact. The stream 704 allows recovery of the volume at any given time, and the image 708 compliments the stream 704 by providing a full representation of the volume at any time "t".

The stream and image scheme itself offers space reduction in that numerous instances of the image may be retained without requiring numerous instances of all the data on the volume to be replicated for each image. The metadata takes up some space, but it is a small fraction of the data payload. Additionally, a stream stores information for writes to blocks that are subsequently overwritten. This uses additional storage space; however, this additional storage is not "wasted" space. It has value, including provision for after the fact recovery as well as other features described further below.

Figure 8:
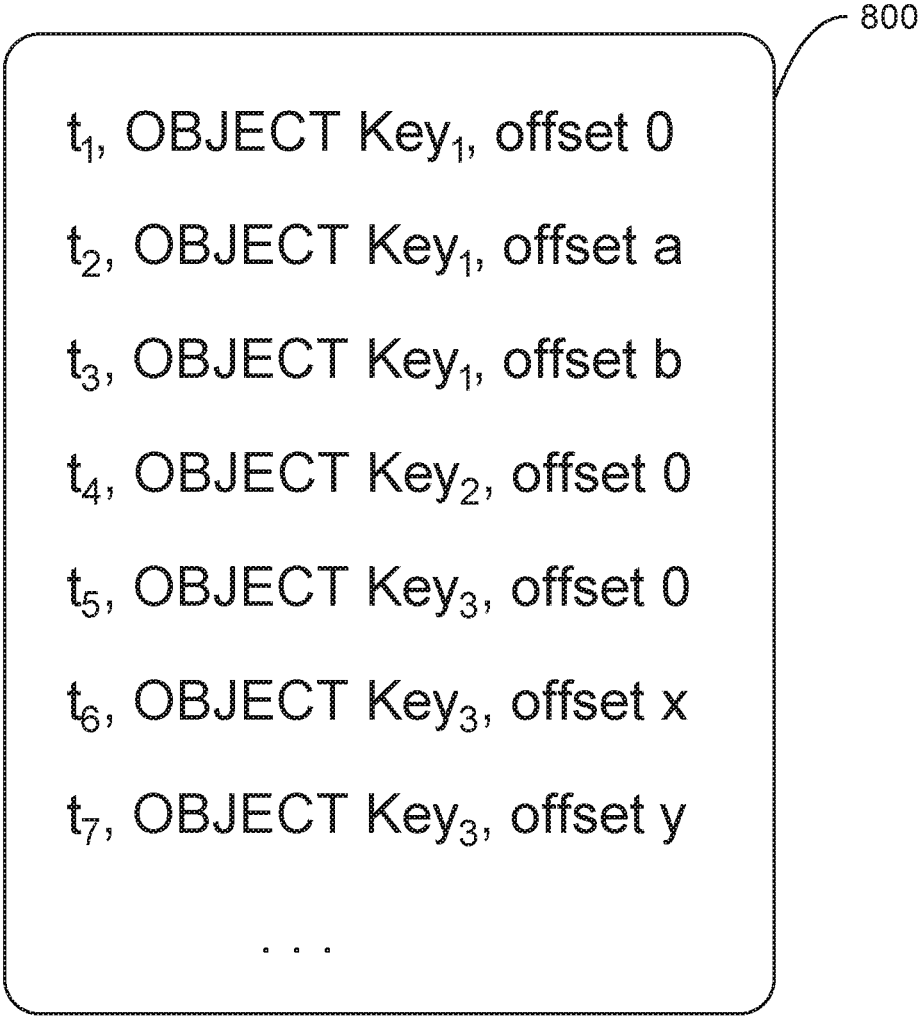
FIG. 8 is a tabular diagram illustrating an example of stream metadata.

FIG. 8 is a tabular diagram illustrating an example of stream metadata 800 configured to support operation in an object-based environment. The stream metadata 800 includes the timestamp, object key and corresponding offset. Typically, the amount of data that can be handled by an object significantly exceeds the amount of data that is found in an individual write transaction. Although a one-to-one relationship between write transactions and objects could be provided, this would be wasteful and would create excess object overhead data. Thus, preferably, the stream is configured to handle the sequence of write transactions directed to a volume at one level of granularity, and is also configured to handle the sequence of objects at another level of granularity. In one example, the stream writes are up to about 1 MB in size, and they are batched into objects of about 2 MB.

Figure 9:
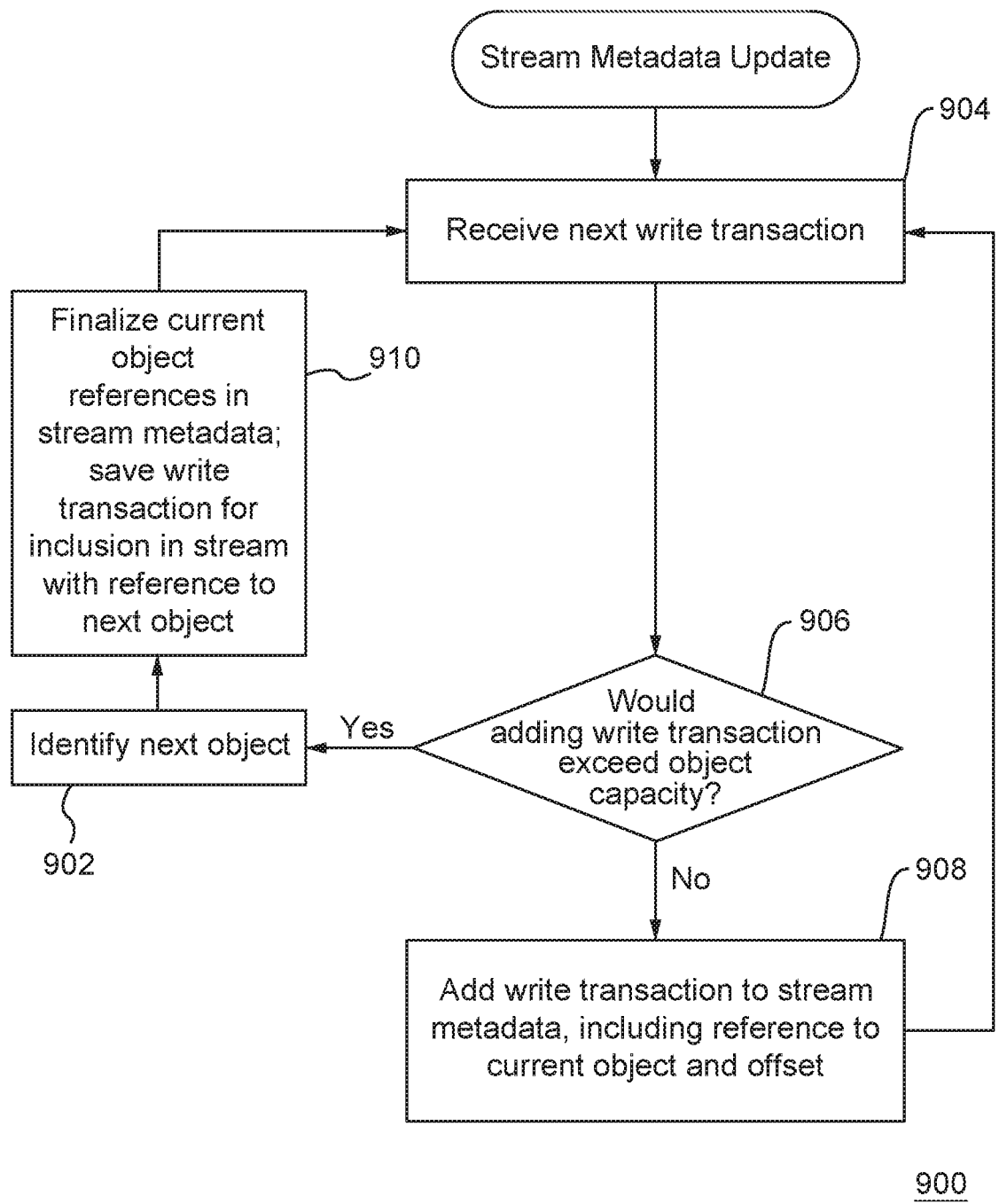
FIG. 9 is a flow diagram illustrating an example of updating stream metadata.

FIG. 9 is a flow diagram illustrating an example of updating stream metadata 900. The object information is part of the metadata. A given (current) object corresponds to one or more write transactions. As described above, typically the capacity of the object will exceed the sizes of individual typical write transactions. Thus, preferably, the updating of the stream metadata entails a coalescing of writes so they fit within prescribed size parameters corresponding to each object. The process of updating the stream metadata thus entails receiving 904 a write transaction, and then determining 906 whether the addition of that write transaction would exceed a threshold corresponding to the object (e.g., the default capacity of the object, or a predetermined value that is assigned to each object). Additionally, within a given object, each write transaction is assigned a corresponding offset. In this fashion, the metadata may be used to index any write transaction in the stream, even though the objects do not offer that level of granularity.

If it is determined 906 that the capacity (e.g., threshold) for the current object is not exceeded, then the write transaction is added 908 to the stream under the current object, including reference to the current object (e.g., key) as well as the offset for the individual write transaction. FIG. 8 offers a simple example of this, with write transactions at t1-3 being encapsulated within an object (object key$_1$) at respective offsets.

If, however, it is determined 906 that the capacity of the current object would be exceeded, then a next object is identified 902. The current object is finalized 910 and the new (next) object is used to continue the stream with the write transaction assigned to the next object. Continuing with the example of FIG. 8, this is shown where the write transaction of time t4 is associated with next object key$_2$.

The stream metadata and the corresponding process provides a combination of the usefulness of the individualized write transaction information along with the flexibility, extensibility and convenience of the object store as the underlying data store.

The stream architecture may optionally implement an append scheme wherein when a space is overwritten on a volume, there is no overwrite in the associated stream. Instead, there is an append to the stream. This means that the stream may be embodied as a data structure, which can exist on Write-once media. This also means that the stream itself can be a type of Write-once media. That is, in some embodiments the stream architecture can be used to implement WORM devices.

Furthermore, a blockchain type approach can be used to guarantee the integrity of the history of the metadata. That is, sections of the metadata include the hash of the previous section and are hashed to verify the integrity of the stream.

Still further, in one example, the hash code is used as a seed for an encryption key for the data. With this additional measure, if the metadata is somehow changed and the hash code modified to appear correct, the data associated with the writes will still be inaccessible because it will have been encrypted with a different key.

It is noted that appending each write transaction to a single location is certainly not the only mechanism for maintaining the stream. The writes can be stored wherever is convenient, may be placed in arbitrary locations, and may implement a plurality of virtual or physical stores. However, whether in a linear append mode or an arbitrary allocation mode, the sequence of write transactions according to the order in which the write transactions are received for a given volume is retained. This maintenance of the sequence of write transaction is preferably performed within the stream itself, in the metadata.

The portion of the stream metadata that retains the write transaction sequence is preferably kept independently from the underlying data itself, particularly where an object store is the underlying data store.

Figure 10A:
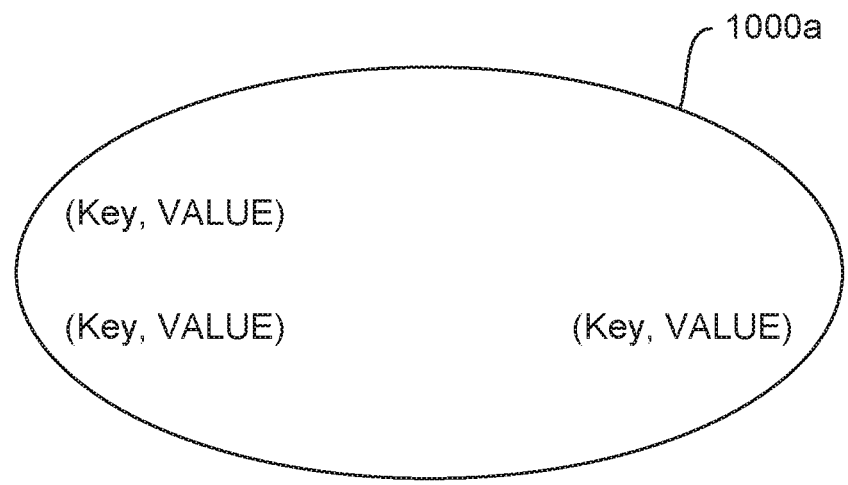
FIGS. 10A-C are diagrams illustrating examples of object store environments.
Figure 10B:
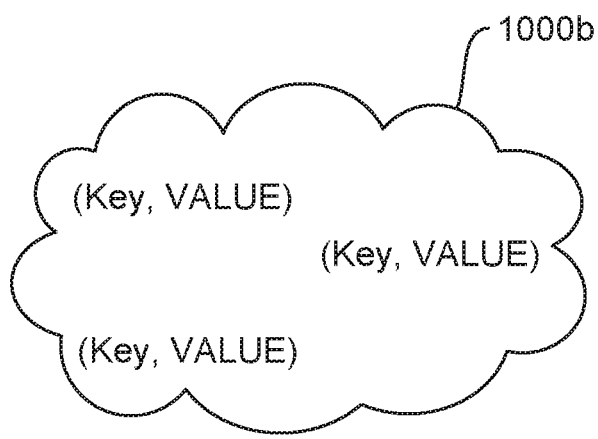
Figure 10C:
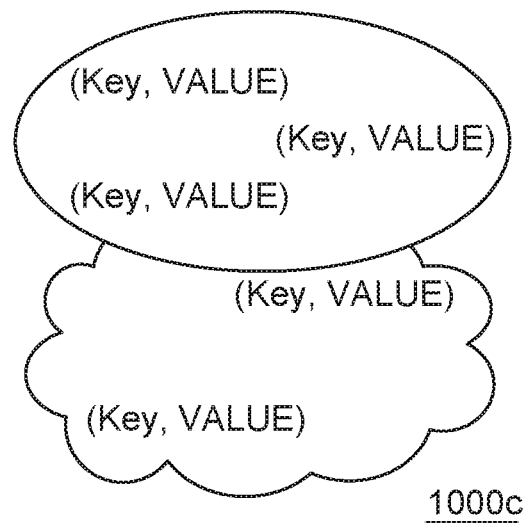

FIGS. 10A-C are diagrams illustrating examples of object store environments 1000a-c. When the data store is embodied as an object store, the stream merely needs to point to the corresponding objects to maintain the coherency of the stream metadata. FIG. 10A generally indicates an object store 1000a to include key and value information whereby the referenced object is identified by the key and contains the data (value). FIGS. 10B and 10C respectively illustrate that cloud resources may be readily implemented to provide the object store, whether the data store is solely resident in the cloud 1000b or is provided as a combination of local and cloud-based resources 1000c.

The stream implemented in the containerized storage microservice may be variously implemented to provide stream images, including full images, sparse images (changes from time tx through ty) and others. A full image (e.g., t5) acts as a snapshot as of that point in time and can be retained as such.

Figure 11:
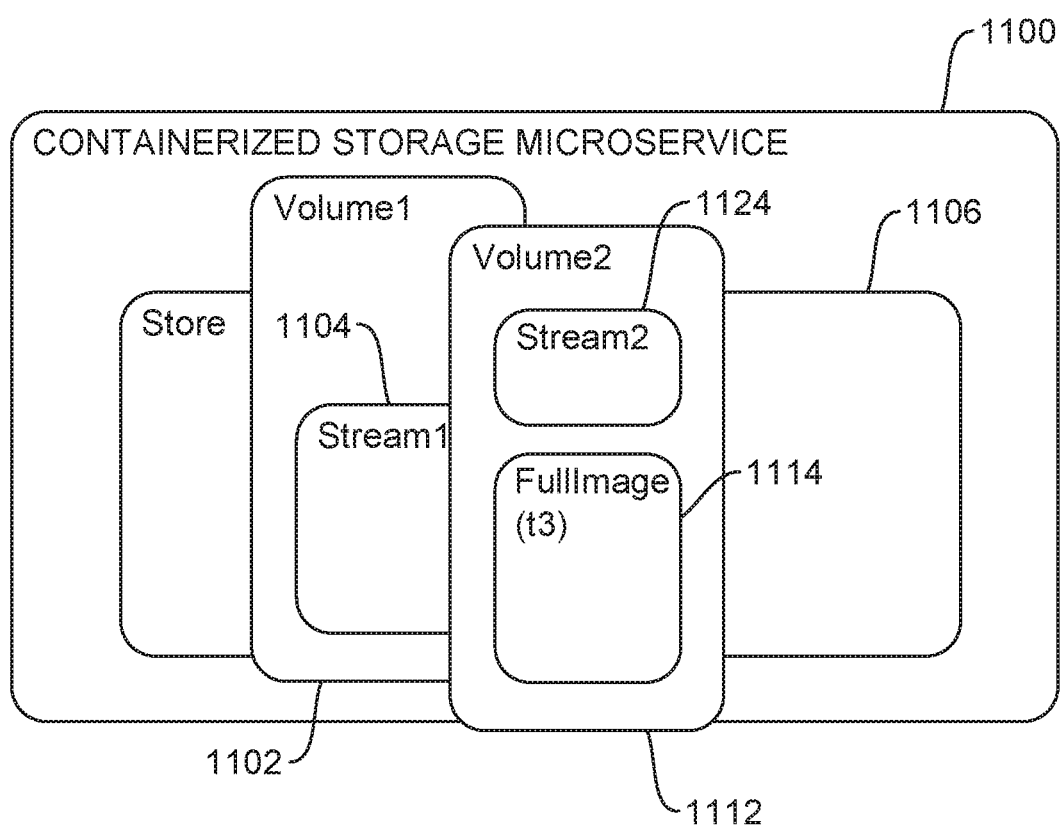
FIG. 11 is a block diagram illustrating a containerized storage microservice that uses multiple layered streams.

The containerized storage microservice is not limited to working with a single stream. Additional streams may also be created, and they may also be layered to provide other enhanced functions. FIG. 11 is a block diagram illustrating a containerized storage microservice 1100 implementing a first stream 1104 and a second stream 1124 in one example of layering. The relationship of a first volume 1102 and corresponding stream 1104 and data store 1106 are again illustrated. A second volume 1112 is correlated to a second stream 1124. Additionally, a full image (t3) correlating to the first stream provides a snapshot of the first volume 1102 at time t3. The second stream 1124 is then used to record write transactions to the second volume 1112 that occur thereafter. In other words, the stream 1124 records all of the changes that occur to the original volume using the representation of full image (t3) as a baseline. This provides a writable point in time volume, or a R/W Snapshot at time t3, in that the full image represents the point-in-time volume at time t3, and the overlaid stream 1124 offers all of the write information directed to the second volume that occur after the point-in-time.

Figure 12:
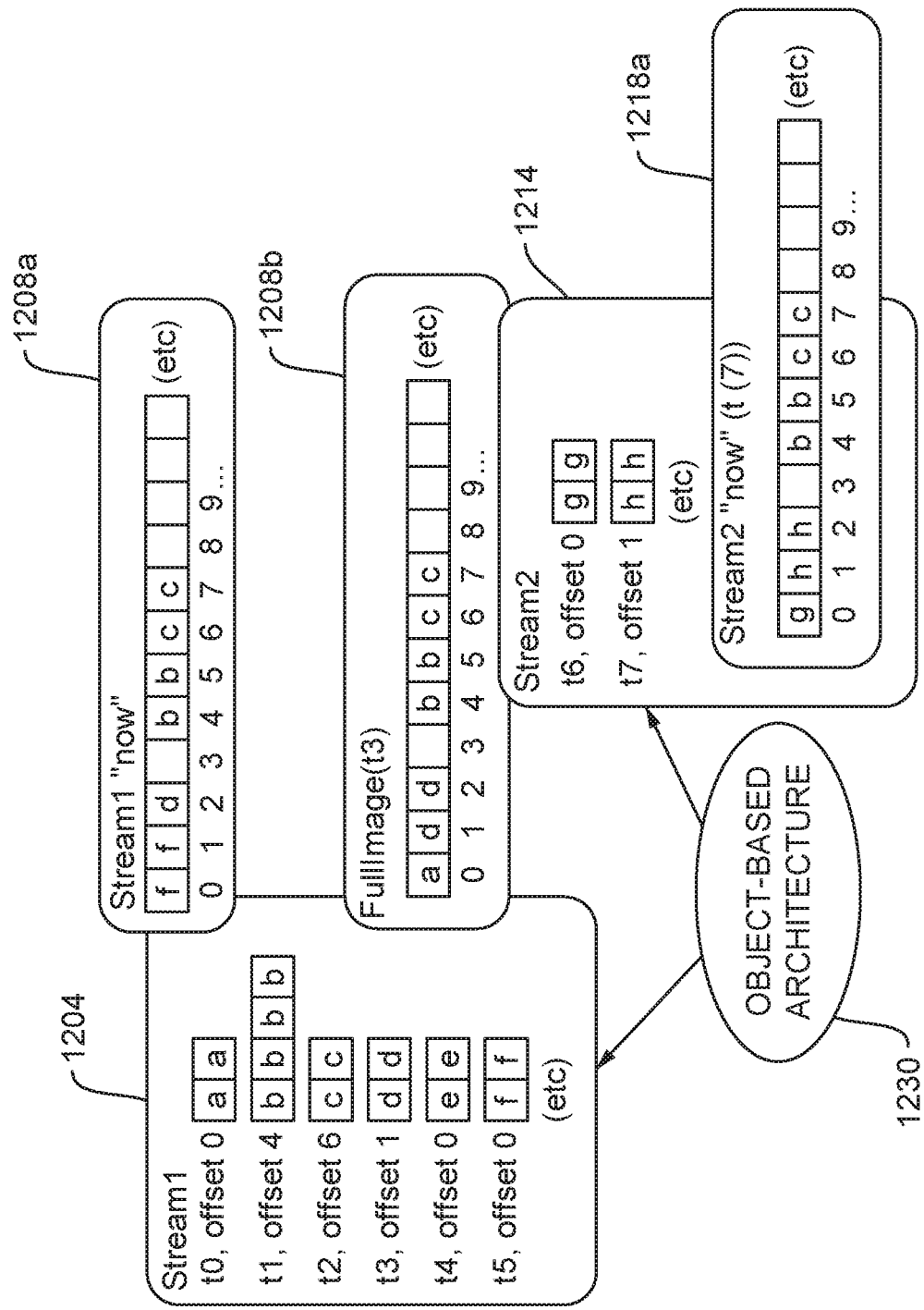
FIG. 12 is a block diagram illustrating multiple streams and corresponding images in an object-based architecture.

FIG. 12 is a block diagram further illustrating multiple streams 1204, 1214 that are managed within an object-based architecture 1230, as well as the layering functionality.

For example, an application container writes to a first volume from time t0 to time t5. A full image may be taken at time t5, as shown in stream image 1208a. Additionally, at some point in time after time t3, a full image at time t3 can be taken, as shown in stream image 1208b. This provides an image, or snapshot, of the first volume as it existed at time t3.

Another stream 1214 is then created on top of, or layered upon, the full image 1208b. A second volume may be associated to this additional stream 1214, and subsequent write transactions may then be directed to that volume and recorded in the additional stream. For example, the write transactions at times t6 and t7 are illustrated in the second stream. Another full image at time t7 can be taken, corresponding to this second volume/stream, shown as full image 1218a.

Reads from the second volume may then use images 1208b and 1218a (as necessary) to access data corresponding to the second stream and (again, if necessary) the first stream. Writes to the new, second volume are simply appended to the second volume's stream 1214. Writes to the original volume can also be appended to the original volume's stream 1204, which does not affect the new stream 1214.

As can be seen in FIG. 12, the stream architecture and its supported layering allow the blocks in offsets 4-7 ("b", "b", "c", "c") to appear in the time t7 image 1218a even though stream 1214 records only changes to offsets 1-2. FIG. 12 also further illustrates how layering supports provision of a R/W snapshot as explained for FIG. 11. Specifically, the full image for time t3 1208b is retained (or generated after the fact) as an archived image from the first stream 1204, and the second stream 1214 records changes thereafter. It should be understood that the layering may continue. For example, a full image of the second stream 1218a may be taken at time t7, and then a new third stream may be layered on top.

Figure 13:
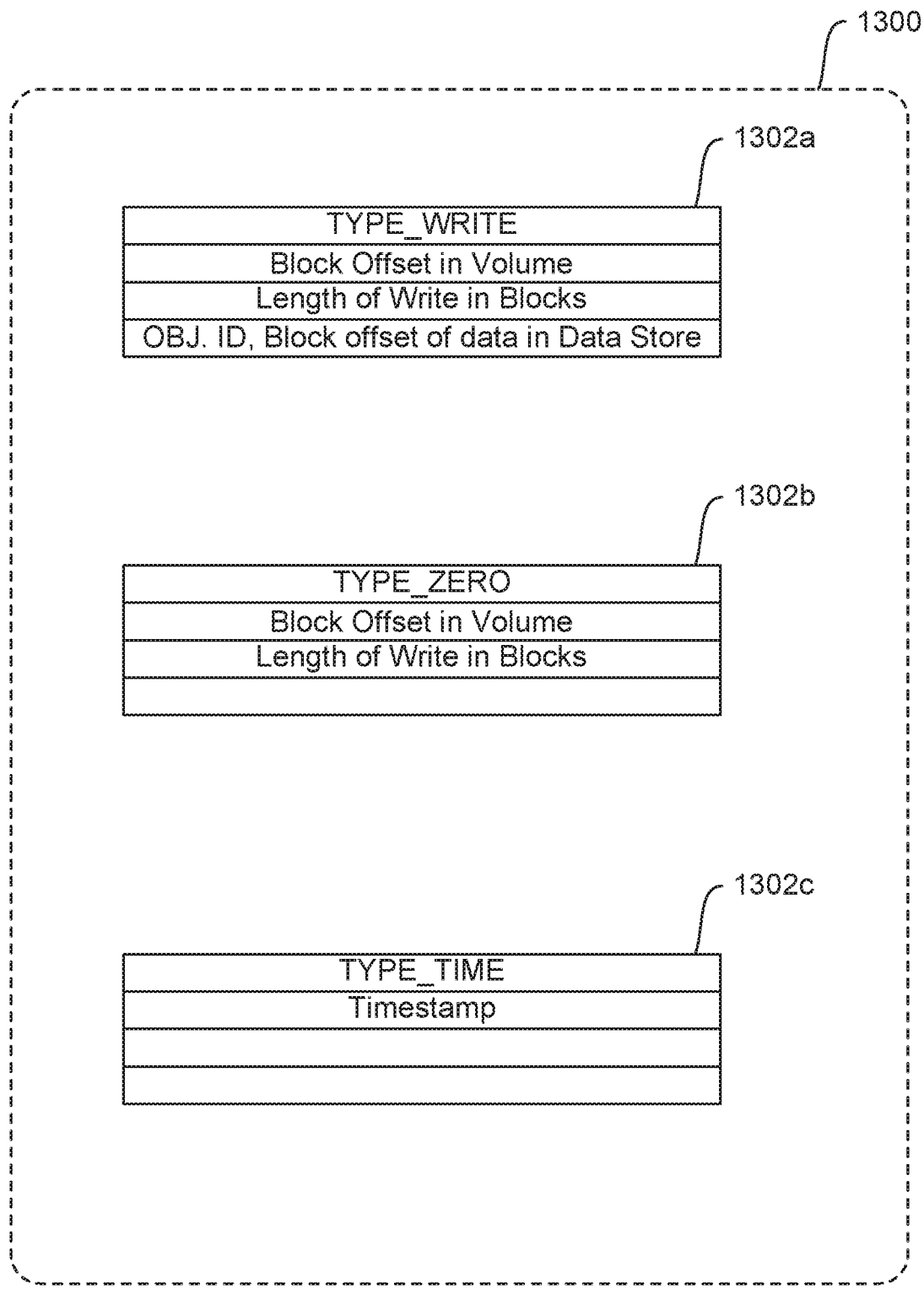
FIG. 13 illustrates examples of object-based architecture compliant stream metadata.

FIG. 13 illustrates examples of object-based architecture compliant stream metadata 1300. In this example, the metadata 1300 entries correlate to write transactions that respectively have numerous (and often differing numbers of) blocks. In this fashion, each write transaction has a "piece" of metadata, rather than requiring metadata for every block. Additionally, the example applies a timestamp only for a new write that has a different timestamp from the previous write, rather than requiring a potentially duplicative timestamp within the metadata for successive writes. Finally, the example comprises metadata that is of equal size, regardless of type. Various alternatives will be readily recognizable, with some specific examples offered below.

Portion 1302a of the metadata 1300 illustrates the building blocks for a typical write to the stream, denoted as "TYPE_WRITE". The metadata portion 1302a includes an entry for the block offset in the corresponding volume, which is the block offset corresponding to the start of the write. Also included are the Length of the Write (in blocks), the Object Key (ID), and the Block Offset of the data in the data store. This metadata provides pointers to the object, as well as the offset within the object, as well an indication of the length of the write. The terms object ID and offset correspond to one preferred implementation but it should be understood that other techniques for identifying the location and size of the data may be implemented.

Another metadata portion 1302b is denoted TYPE_ZERO. This type of metadata is used to provide an optimization wherein a write consisting of zeroes is recorded without requiring the corresponding zeroes to actually be physically stored. This can significantly economize on the use of storage for data in the stream.

The TYPE_ZERO metadata includes the block offset in the volume and the length of write in blocks, similar to that provided in the TYPE_WRITE metadata. However, it is not necessary to retain the Object ID and block offset in the data store, since physical storage is not required. Accordingly, this entry of the metadata is blank (as noted, in this example the types of metadata are of the same size). The usage of zeroes is purely by way of example. Additionally, the same principles may be applied to accommodate the same economization of storage where "ones" or other values are to be repeatedly stored.

Finally, a TYPE_TIME metadata portion 1302c is a type of metadata that adds a timestamp to the stream whenever a write occurs unless the previous write had the same timestamp value. In this fashion, successive writes that essentially occur at the same time (according to the granularity of the time stamp) avoid additional metadata expense.

It should be appreciated that FIG. 13 depicts one example of a set of metadata, and that numerous alternatives are available. For example, (1) additional types of metadata may be included; (2) the metadata may omit the TYPE_ZERO or the TYPE_TIME types; (3) a timestamp could be included as an entry in every TYPE_WRITE instance of metadata; (4) characteristics other than object ID and offset may be used to define the location and size of data being stored. The artisan will readily recognize these and other potential options.

Figure 14:
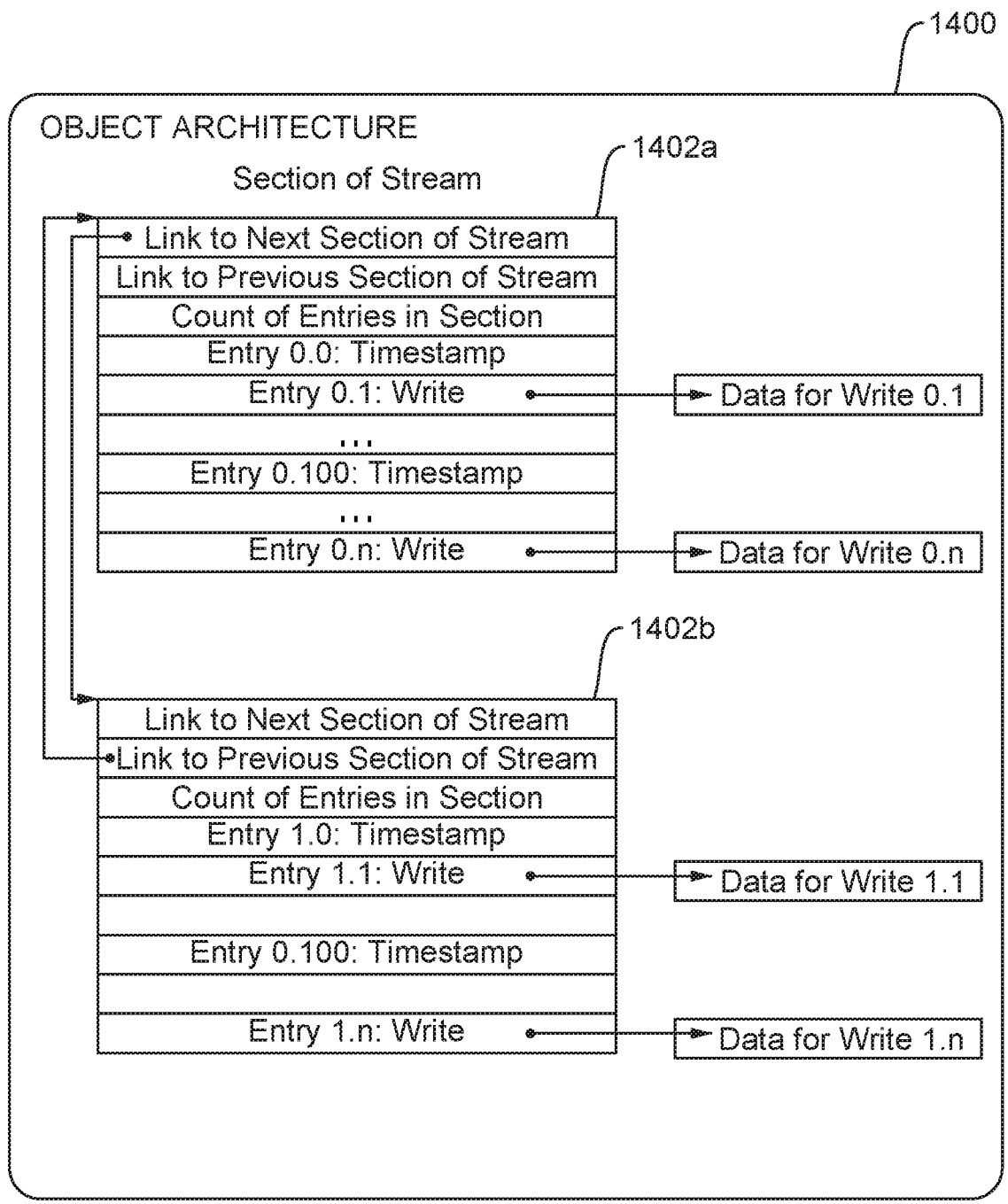
FIG. 14 is a block diagram illustrating an example of an object-based architecture compliant stream layout with multiple stream sections.

FIG. 14 is a block diagram illustrating an example of an object-based architecture based stream layout 1400 as well as the option of composing a stream of Sections 1402a-b. With the sectioning feature, portions of the stream are easily segregated. This is useful for managing the location of the constituent sections of the stream, particularly where different storage resources are implemented for different portions of the stream. The use of sections 1402a-b is optional, as a single stream layout may be provided without sectioning. A single stream layout option would include the features of either section 1402a or 1402b, without the links to other sections.

The sections 1402a-b respectively include Link to Next Section and Link to Previous Section entries to accommodate organization of the sectional relationship. The subsequent entry provides the number of entries "n" in the section 1402a-b.

Following this, any of the metadata types may follow, such as the indicated Entry 0.0, which is a TYPE_TIME or timestamp entry, following by Entry 0.1, which is a TYPE_WRITE, entry 0.2, which is also a TYPE_WRITE, and so on. The pointer from the TYPE_WRITE type entries is illustrative of the indication of the location of the data in the data store, with corresponding indicia of the Data for Write 0.1, 0.2, and so on through entry 0.n within Section 1502a, and Write 1.1 through 1.n within Section 1402b. It should be understood that the write transactions may be retained according to the linear append or arbitrary allocation modes as described previously. Either way, the stream layout 1400 illustrates an example of retaining the sequence of write transactions according to the order in which the write transactions are received for a volume.

Figure 16:
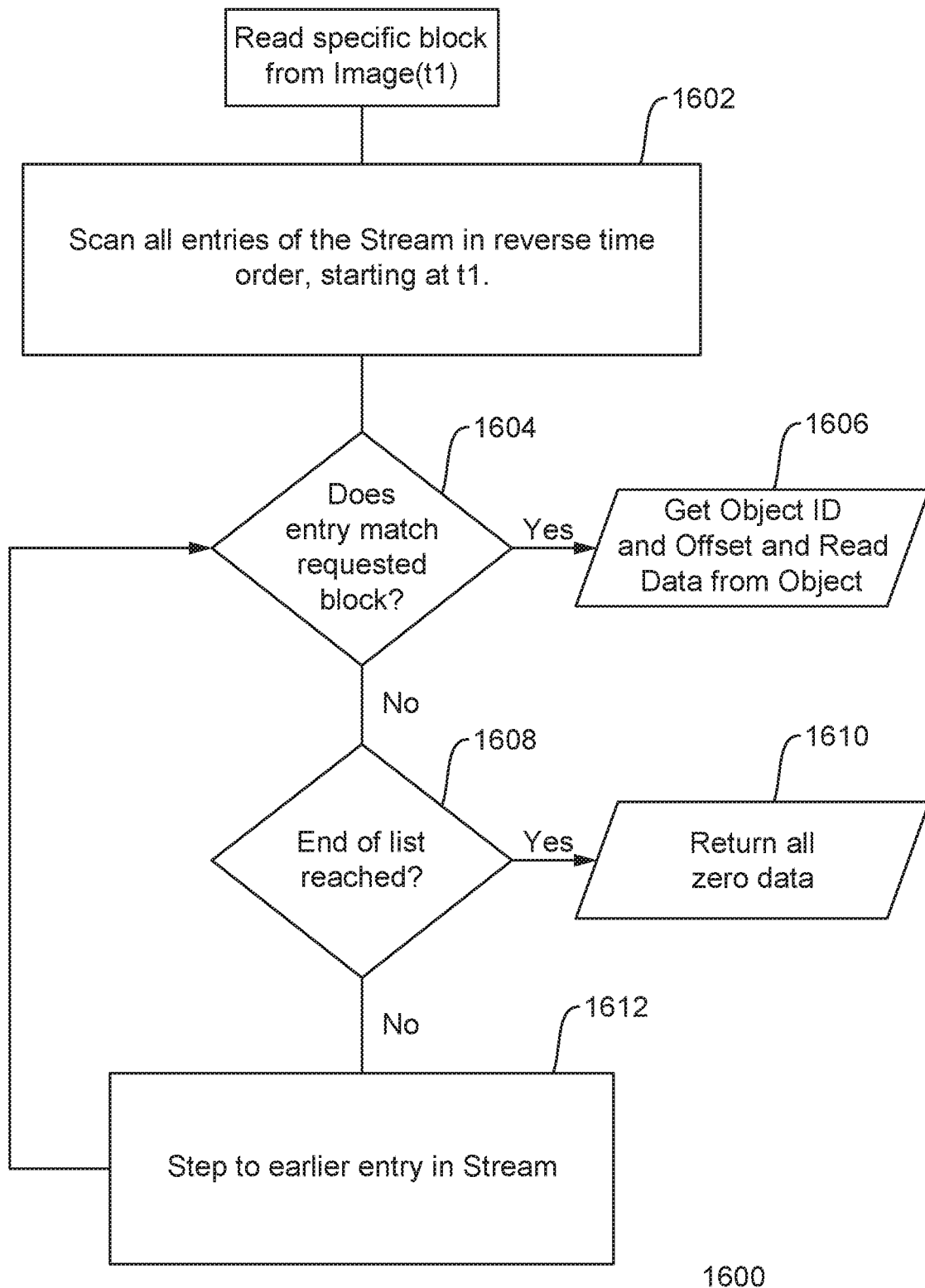
FIG. 16 is a flow diagram illustrating an example of accessing an image and reading a block.

FIG. 16 illustrates an example of accessing an image and reading a block of data. To carry out a read of a specific block in a volume, the specific block is identified according to the offset in the volume. All of the entries in the stream are scanned 1602 in reverse time order, starting at the time tx corresponding to the read (could be "now" or any valid intervening time value). This may optionally include navigation among multiple sections of the stream as described above, or with layering it may include navigation through multiple streams.

Within this scanning in reverse time order, matching 1604 entries are any entries in the stream referencing the same offset in the volume for the specific block being read. If there is not a match 1604, the process steps 1612 to earlier entries in the stream to progress through in the reverse time order. If there is no hit, and it is determined that there are no further entries in the stream 1608, then all zeroes are returned 1610. Once there is a "hit", in step 1606, the data block specified in the entry can be read by identifying the object ID and offset and then reading the data from the object.

A write may correspond to multiple blocks. For a write, an object is initially allocated from the data store according to the requested write, and the data is written to the allocated object. If desired, a write zero scheme maybe implemented, using metadata such as the TYPE_ZERO type as described above. In such a scheme the zeroes are not actually written to the data store. The stream metadata is updated to reflect the timestamp, object key, offset, and write length data. Once the new object key is allocated, the write is appended to the object until it reaches capacity. The underlying object store manages the correspondence to disk.

Figure 15:
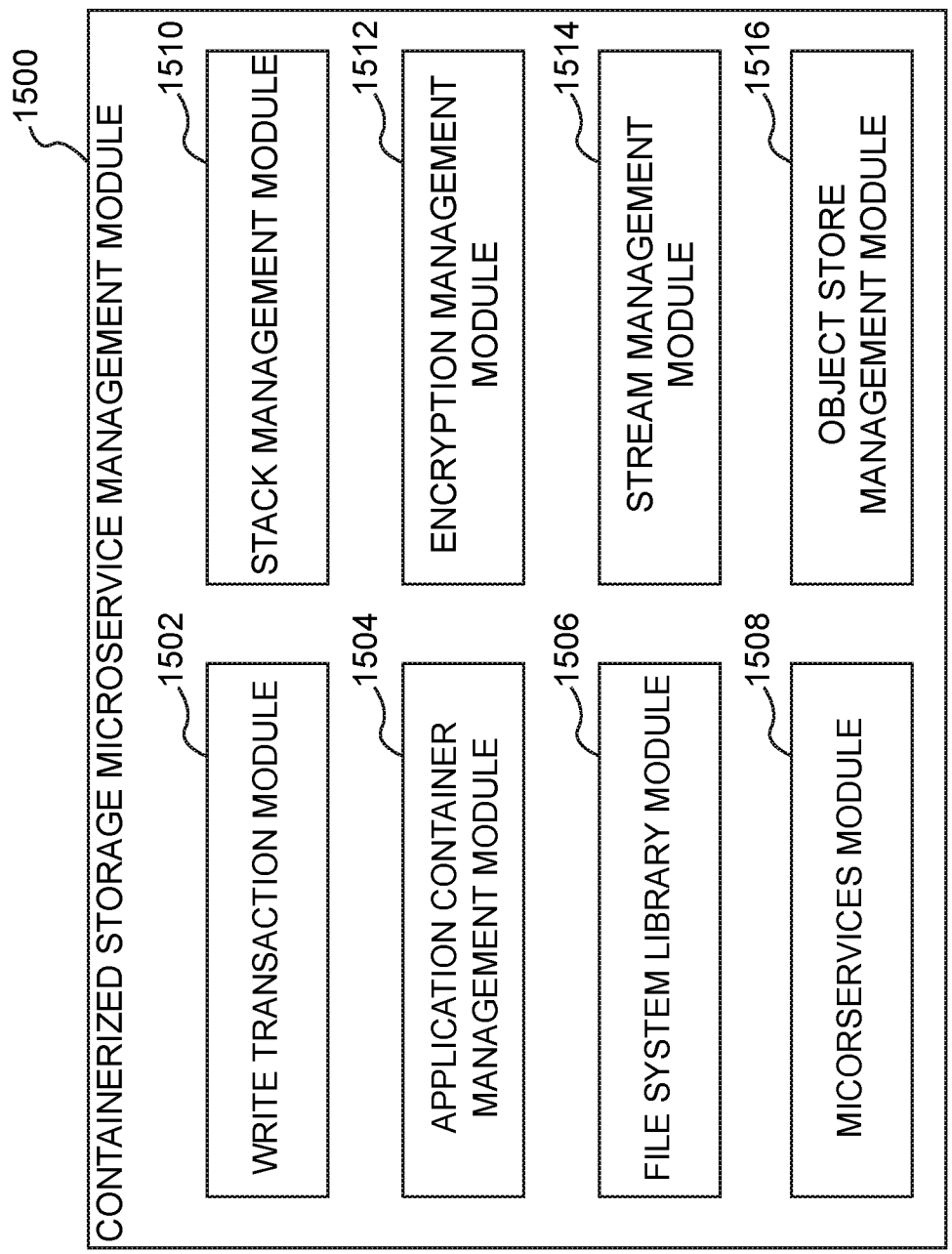
FIG. 15 is a block diagram illustrating example of a computer system configured to include a containerized storage microservice management module.

FIG. 15 is a block diagram illustrating example of a computer system configured to include a containerized storage microservice management module 1500. Specifically, the containerized storage microservice module 1500 includes a write transaction module 1502, an application container management module 1504, a file system library module 1506, a microservices module 1508, a stack management module 1510, an encryption management module 1512, a stream management module 1514, and an object store management module 1516. The application container management module 1504 facilitates the generation of application containers and their association to corresponding volumes, which is preferably arranged on a one-to-one basis (i.e., a new volume is created for each application container). The file system library module 1506 maintains the library corresponding to the thin level of file system services to be provided for each application container arranged to invoke the containerized storage microservices. The microservices module 1508 maintains and organizes all of the various microservices that are available in various instances of the containerized storage microservices. Various services are represented, including copy, snap, encryption, etc. The stack management module 1510 facilitates the various stack arrangements that can be made using the different types of containerized storage microservices. The encryption management module 1512 manages the encryption scheme and corresponding information used to carry out the fully encrypted storage services request process described above. In one embodiment, the containerized storage microservice management module 1500 implements a stream architecture along with an object store. These are optional, as noted above, but where they are provided, the write transaction module 1502, the stream management module 1514 and the object store management module 1516 are provided. The write transaction module 1502 receives writes directed to volumes presented to application containers, and the stream management module 1514 is configured to manage the retention of the stream based upon the received write transactions corresponding to any given volume. The writes can be stored wherever is convenient, may be placed in arbitrary locations, and may implement a plurality of virtual or physical stores. Preferably, the data store is an object store as has been described. Whether writes are simply linearly appended or arbitrary allocated, the sequence of write transactions according to the order in which the write transactions are received for a given volume is retained. Additionally, the stream is preferably retained as metadata separate from the actually-stored data, although they may also be retained together. Stream images can be associated to the stream. The various types of stream images are described above. Generally, a stream image provides a representation of the data in a given volume for a point in time by referencing a non-contiguous subset of the sequence of write transactions in the stream. Noted examples include full and sparse image representations of the data in the given volume. Layering of stream images is also provided as described previously. Finally, any given stream image may be generated for the point in time retroactively, to accommodate retrieval of the full (or other) representation of the data in the given volume at a time after the point in time has passed. The object store management module 1516 interfaces with the data store and manages updates to existing objects and the instantiation of new objects as writes are received, potentially coalesced, and reflected in the stream. Similarly, the object store module 1108 provides coherent access to object(s) based upon read requests.

The containerized storage microservice management module 1500 is preferably provided as software, but may also implement hardware, firmware, or combinations of software, hardware, and/or firmware. It may be stored in memory and execute on a conventional processing platform as shown and described. The program code to provide the module may also be stored in non-volatile memory including but not limited to hard disks, optical disks, flash drives, or any non-transitory computer readable medium.

Thus embodiments of the present invention produce and provide application containers with direct connections to containerized storage microservices. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for processing IO requests from an application container using a containerized storage microservice, the application container and the containerized storage microservice executing in a containerized computing environment that implements a host operating system having a file system, the method comprising:
   intercepting an IO request within the application container; and
   bypassing the file system of the host operating system by directly connecting the IO request to the containerized storage microservice within the containerized computing environment.

2. The method according to claim 1, wherein the IO request is directly connected to the containerized storage microservice through a file system module of a storage microservices stack that includes the containerized storage microservice.

3. The method according to claim 2, wherein the application container is configured to include a library that intercepts the IO request and connects to the file system module of the storage microservices stack.

4. The method according to claim 1, wherein directly connecting the IO request to the containerized storage microservice is through an encrypted connection within the containerized computing environment.

5. The method according to claim 4, wherein the containerized storage microservice performs an authenticated access corresponding to the IO request by maintaining an application identifier and cryptographic hash corresponding to the application container.

6. A non-transitory computer readable medium storing program code for processing IO requests from an application container using a containerized storage microservice, the application container and the containerized storage microservice executing in a containerized computing environment that implements a host operating system having a file system, the program code being executable by a processor to perform operations comprising:
   intercepting an IO request within the application container; and
   bypassing the file system of the host operating system by directly connecting the IO request to the containerized storage microservice within the containerized computing environment.

7. The non-transitory computer readable medium according to claim 6, wherein the IO request is directly connected to the containerized storage microservice through a file system module of a storage microservices stack that includes the containerized storage microservice.

8. The non-transitory computer readable medium according to claim 7, wherein the application container is configured to include a library that intercepts the IO request and connects to the file system module of the storage microservices stack.

9. The non-transitory computer readable medium according to claim 6, wherein directly connecting the IO request to the containerized storage microservice is through an encrypted connection within the containerized computing environment.

10. The non-transitory computer readable medium according to claim 9, wherein the containerized storage microservice performs an authenticated access corresponding to the IO request by maintaining an application identifier and cryptographic hash corresponding to the application container.

11. An apparatus for processing IO requests from an application container using a containerized storage microservice, the application container and the containerized storage microservice executing in a containerized computing environment that implements a host operating system having a file system, the apparatus comprising:
 a processor; and
 a memory, the memory storing program code executable by the processor to perform operations comprising:
 intercepting an IO request within the application container; and
 bypassing the file system of the host operating system by directly connecting the IO request to the containerized storage microservice within the containerized computing environment.

12. The apparatus according to claim 11, wherein the IO request is directly connected to the containerized storage microservice through a file system module of a storage microservices stack that includes the containerized storage microservice.

13. The apparatus according to claim 12, wherein the application container is configured to include a library that intercepts the IO request and connects to the file system module of the storage microservices stack.

14. The apparatus according to claim 11, wherein directly connecting the IO request to the containerized storage microservice is through an encrypted connection within the containerized computing environment.

15. The apparatus according to claim 14, wherein the containerized storage microservice performs an authenticated access corresponding to the IO request by maintaining an application identifier and cryptographic hash corresponding to the application container.

\* \* \* \* \*